United States Patent [19]

Yunoki et al.

[11] Patent Number: 4,651,227
[45] Date of Patent: Mar. 17, 1987

[54] VIDEO SIGNAL RECORDING APPARATUS WITH A/D CONVERSION

[75] Inventors: Yutaka Yunoki; Kenji Kimura, both of Tokyo, Japan

[73] Assignee: Olympus Optical Co., Ltd., Tokyo, Japan

[21] Appl. No.: 522,188

[22] Filed: Aug. 10, 1983

[30] Foreign Application Priority Data

Aug. 20, 1982 [JP] Japan ............................. 57-144559
Aug. 20, 1982 [JP] Japan ............................. 57-144561

[51] Int. Cl.⁴ ..................... H04N 9/493; H04N 5/78
[52] U.S. Cl. ................................ 358/310; 358/335; 358/909; 360/32; 360/35.1
[58] Field of Search ............... 360/35.1, 32; 358/335, 358/310, 906, 339, 213, 909

[56] References Cited

U.S. PATENT DOCUMENTS 4,058,828 11/1977 Ladd .
4,130,834 12/1978 Mender et al. .
4,131,919 12/1978 Lloyd et al. ..................... 360/35.1 X
4,293,871 10/1981 Macovski .
4,456,931 6/1984 Toyoda et al. ................... 358/906 X
4,475,131 10/1984 Nishizawa et al. ................ 358/335
4,488,180 12/1984 Rabinowitz ........................ 358/183

FOREIGN PATENT DOCUMENTS 2916334 10/1979 Fed. Rep. of Germany .
54-140510 10/1979 Japan .
56-40539 9/1981 Japan .
56-158583 12/1981 Japan .
57-21186 2/1982 Japan .
57-50177 3/1982 Japan .

Primary Examiner—Robert L. Richardson
Attorney, Agent, or Firm—Frishauf, Holtz, Goodman & Woodward

[57] ABSTRACT

A video signal recording apparatus for recording outputs from a solid-state image pickup device on a magnetic disc. The output pixel signals from the solid-state image pickup device are written in a pixel memory through an A/D converter in units of pixels at a write rate equal to a read rate of the solid-state image pickup device. The pixel signals in the pixel memory are read out at a read rate lower than the write rate thereof. The readout data are D/A-converted and are supplied to a processing amplifier. The processing amplifier produces a video signal which is then recorded on the magnetic disc.

14 Claims, 20 Drawing Figures

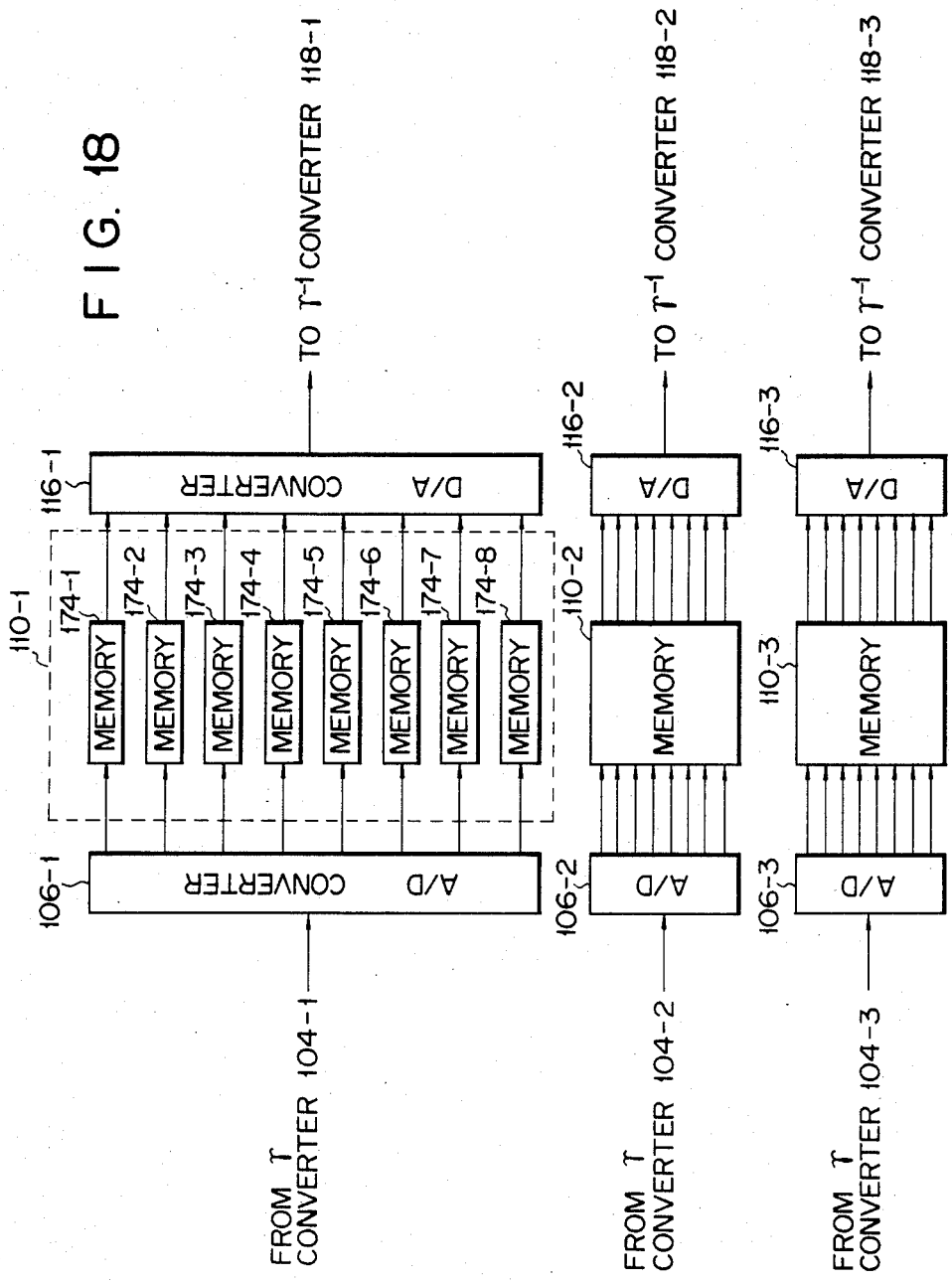

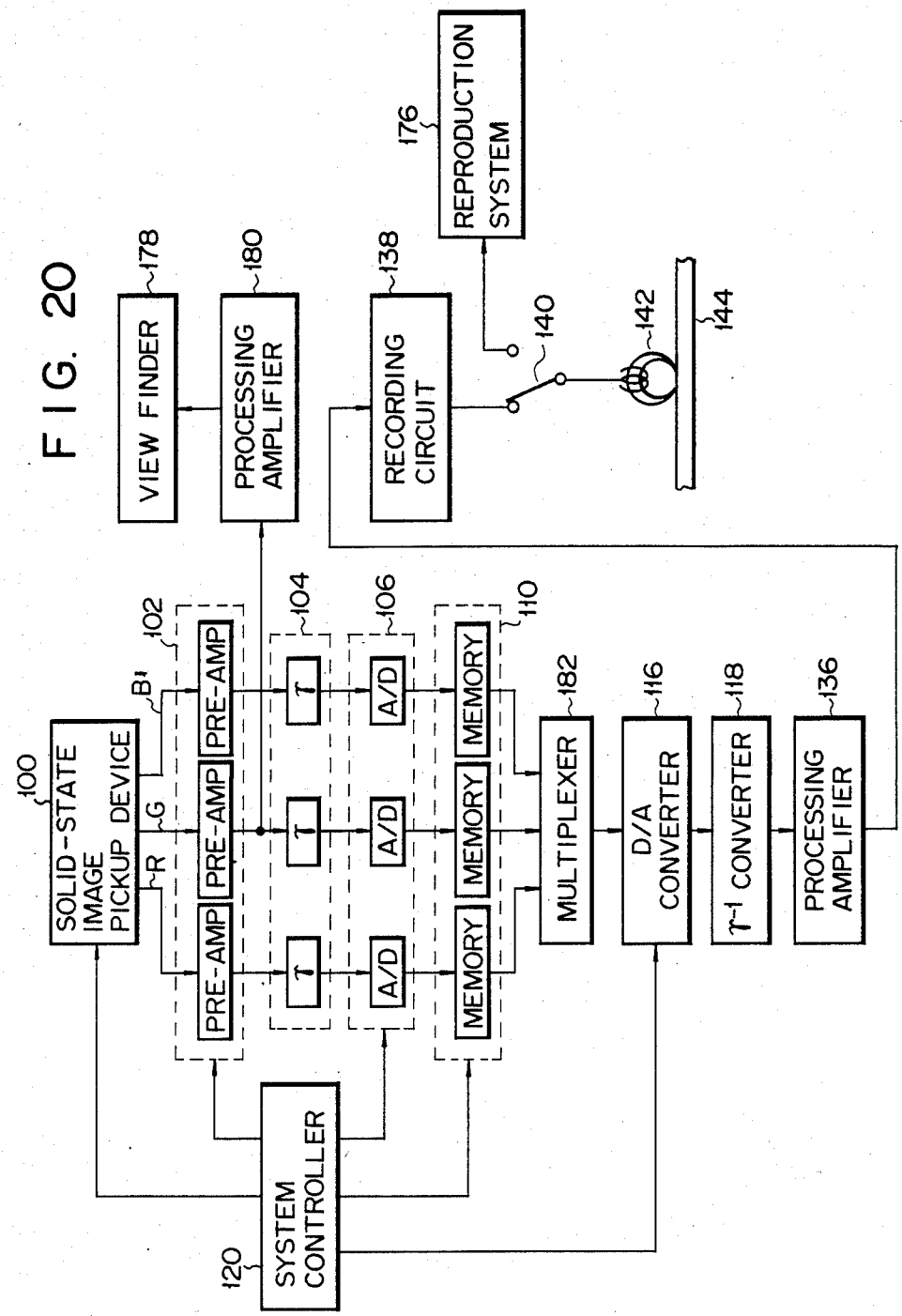

VIDEO SIGNAL RECORDING APPARATUS WITH A/D CONVERSION

BACKGROUND OF THE INVENTION

The present invention relates to a video signal recording apparatus suitable for recording a video signal, especially a video signal representing a still image.

Recently, video signal recording apparatuses have been commercially available in place of cameras using silver chloride films to record a video signal representing a still image. The video signal specifications resemble those of current television systems. For this reason, a still image obtained by reproducing a recorded video signal is inferior in resolution, hue, etc. to a picture taken by a conventional camera. Therefore, there has arisen a demand for improved image quality in such video signal recording apparatuses for still images.

The most significant problem in the improvement of image quality is the fact that a frequency bandwidth of the video signal must be shifted to a higher bandwidth. The specifications of the high quality television system proposed by NHK (Nippon Hosso Kyokai) are given as follows. Values given in parentheses are specifications of the current NTSC television system.

Luminance (Y) signal bandwidth: 20 MHz (4.5 MHz)
Chrominance signal
    Wide band chrominance signal ($C_W$): 7 MHz (1.5 MHz)
    Narrow band chrominance signal ($C_N$): 5.5 MHz (0.5 MHz)
Chrominance subcarrier frequency: 24.3 MHz (3.58 MHz)
Horizontal Scanning frequency: 33.75 kHz (15.74 kHz)
Number of frames per second: 30 (30)
Number of horizontal scanning lines: 1125 (525).

In the high quality television system, the frequency bandwidth falls in the range of 20 MHz to 30 MHz. The frequency bandwidth is increased to several times that of the current NTSC system.

A conventional video signal recording/reproduction system of this high quality television system is illustrated in FIG. 1. R, G and B color component signals are supplied from a high quality TV camera 10 having three color tubes to a matrix circuit 12, thereby obtaining a luminance signal Y, a wide band chrominance signal $C_W$ and a narrow band chrominance signal $C_N$. A sync signal is superimposed on the luminance signal Y by a sync mixer 14 and the resultant signal is then supplied to a first channel magnetic head 20 through a frequency modulator 16 and a recording amplifier 18. The signals $C_W$ and $C_N$ are sequentially supplied to a line sequence converter 22 and are combined. A composite signal from the line sequence converter 22 is supplied to a second channel magnetic head 28 through a frequency modulator 24 and a recording amplifier 26. A carrier frequency of the frequency modulators 16 and 24 is set to be 34.5 MHz. The magnetic heads 20 and 28 record signals on a magnetic sheet 30 having a diameter of 0.5 m. The magnetic sheet 30 is rotated by a motor 32 at a rotational frequency of 60 rps and moves at a speed of 84 m/s relative to the magnetic heads 20 and 28. An output luminance signal from the sync mixer 14 is supplied to a sync separator 34, so that the sync signal can be separated from the luminance signal. A clock generator 36 generates a clock signal having a frequency of 60 Hz in response to an output from the sync separator 34. The clock signal is then supplied to the motor 32 through a drive amplifier 38. Therefore, the motor 32 causes the magnetic sheet 30 to rotate at the rotational frequency of 60 rps.

Switches 40 and 42 are arranged between the recording amplifier 18 and the magnetic head 20 and between the recording amplifier 26 and the magnetic head 28, respectively, so that signals from the magnetic heads 20 and 28 may be supplied to a reproduction system. The signal from the first channel magnetic head 20 is applied through the switch 40 to a reproduction amplifier 44. The output of the amplifier 44 is applied to an FM demodulator (DEMOD) 48 through an equalizer 46. The output of the demodulator (DEMOD) 48 is used as the luminance signal Y. The signal from the second channel magnetic head 28 is applied through the switch 42 to a reproduction amplifier 50. The output of the amplifier 50 is applied to a line sequence converter 54 through an FM demodulator 52, to produce a wide band chrominance signal $C_W$ and a narrow band chrominance signal $C_N$. The luminance signal Y, the wide band chrominance signal $C_W$ and the narrow band chrominance signal $C_N$ are supplied to a matrix circuit 6. The R, G and B color component signals are then supplied from the matrix circuit 56 to a high quality CRT monitor 58. As a result, a color still image can be reproduced by 1125 horizontal scanning lines. The monitoring reproduction system is operated in the recording mode such that the outputs (indicated by broken lines) from the frequency modulators 16 and 24 are directly supplied to the FM demodulators 48 and 52, respectively.

The high quality video recording/reproduction apparatus of this type has a large size and is costly, since a large magnetic sheet is used to record/reproduce the video signals. Therefore, the apparatus of this type must comprise a fixed installation, and cannot be used in place of a conventional camera. A portable video signal recording/reproducing apparatus must be compact, lightweight, and less costly, and have a low power consumption (battery operated). The apparatus shown in FIG. 1 cannot be arranged as a portable apparatus since a high frequency band signal is directly recorded in a large-capacity memory (magnetic sheet) without performing frequency band conversion through a buffer memory such as a frame memory.

FIG. 2 shows a conventional system for recording one-frame video signals in a frame memory, these signals being produced by a TV camera used in the current NTSC system. Analog color component signals W (white), Ye (yellow), Cy (cyan) and G (green) obtained by photoelectric conversion in units of pixels, in a solid-state image pickup device 60 having a CCD, for example, are supplied to a matrix circuit 64 through a pre-amplifier 62. R, G and B color component signals are supplied from the matrix circuit 64 to a process IC 70 through an FPN suppression IC 66 and a low-pass filter 68. The outputs from the FPN suppression IC 66 are also supplied to a V smear compensator 72. Outputs from the process IC, 70 are supplied to an encoder IC 74 and are superimposed with a sync signal from a sync IC 76, thereby obtaining an NTSC video signal. The NTSC video signal from the encoder IC 74 is digitally written in a frame memory 82 through a buffer 78 and an A/D converter 80. The written frame image can be checked by an electronic view finder 84 connected to the output terminal of the buffer 78.

In the NTSC system, the frequency bandwidth of the video signal falls within the range (industrial) 0 to 4.5 MHz or the range (commercial) 0 to 2 MHz. In order to A/D-convert a video signal, the sampling frequency is set to three to four times a chrominance subcarrier frequency $f_{SC}$. Since the subcarrier frequency $f_{SC}$ is 3.58 MHz in the NTSC system, the sampling frequency, which is equal to four times the NTSC subcarrier frequency, is 14.32 MHz. When one-sample data of one pixel is A/D-converted to 8-bit data, the frame memory for storing one-frame video signals must have a capacity of 3.8 Mbits ($\approx 8 \times 14.32 \times 1/30$).

If the video signal bandwidth input to the A/D converter 80 falls within the range 0 to 10 MHz, the Nyquist rate is set to 14.32 MHz, so that beat noise occurs between the video signal having a frequency close to the Nyquist rate and the sampling signal of the A/D converter 80. For this reason, the frequency band of the video signal is limited by an LPF 68, as indicated by the dotted line in FIG. 3.

In the system of the type described above, the signals from the pixels of the solid-state image pickup device 60 are converted to a single analog NTSC signal, and the converted signal is written in the frame memory 82 after A/D-conversion. For this reason, the data from each pixel may not be written per se in the frame memory due to a slight deviation in sampling frequency of A/D conversion and to a phase deviation of the analog circuit.

When the recording system shown in FIG. 2 is applied to the high quality image as previously described, the sampling frequency of the A/D converter becomes 97.2 MHz ($=24.3 \times 4$). As a result, given current semiconductor techniques, a portable apparatus is not possible when cost, size and power consumption are considered. Furthermore, the frame memory must have a capacity of 26 Mbits ($\approx 8 \times 97.2 \times 1/30$), which precludes production of a portable video signal recording-/reproduction apparatus.

SUMMARY OF THE INVENTION

It is an object of the present invention to provide a portable video signal recording apparatus having an image pickup section and a recording section partially or completely incorporated as an integral unit to record a high quality video signal having a high frequency band.

In order to achieve the above object of the present invention, there is provided a video signal recording apparatus comprising an image pickup section having a plurality of pixels arranged in a matrix form, an A/D converter for converting an analog video signal produced from the image pickup section to a digital pixel signal, and a pixel memory for storing the digital pixel signal from the A/D converter in units of pixels.

BRIEF DESCRIPTION OF THE DRAWINGS

FIG. 18 is a block diagram of a pixel memory of the third embodiment shown in FIG. 14;

FIG. 20 is a block diagram of a video signal recording apparatus according to a fifth embodiment of the present invention.

DETAILED DESCRIPTION OF THE PREFERRED EMBODIMENTS

An embodiment of a video signal recording apparatus according to the present invention will be described below, referring to the accompanying drawings.

Figure 1:
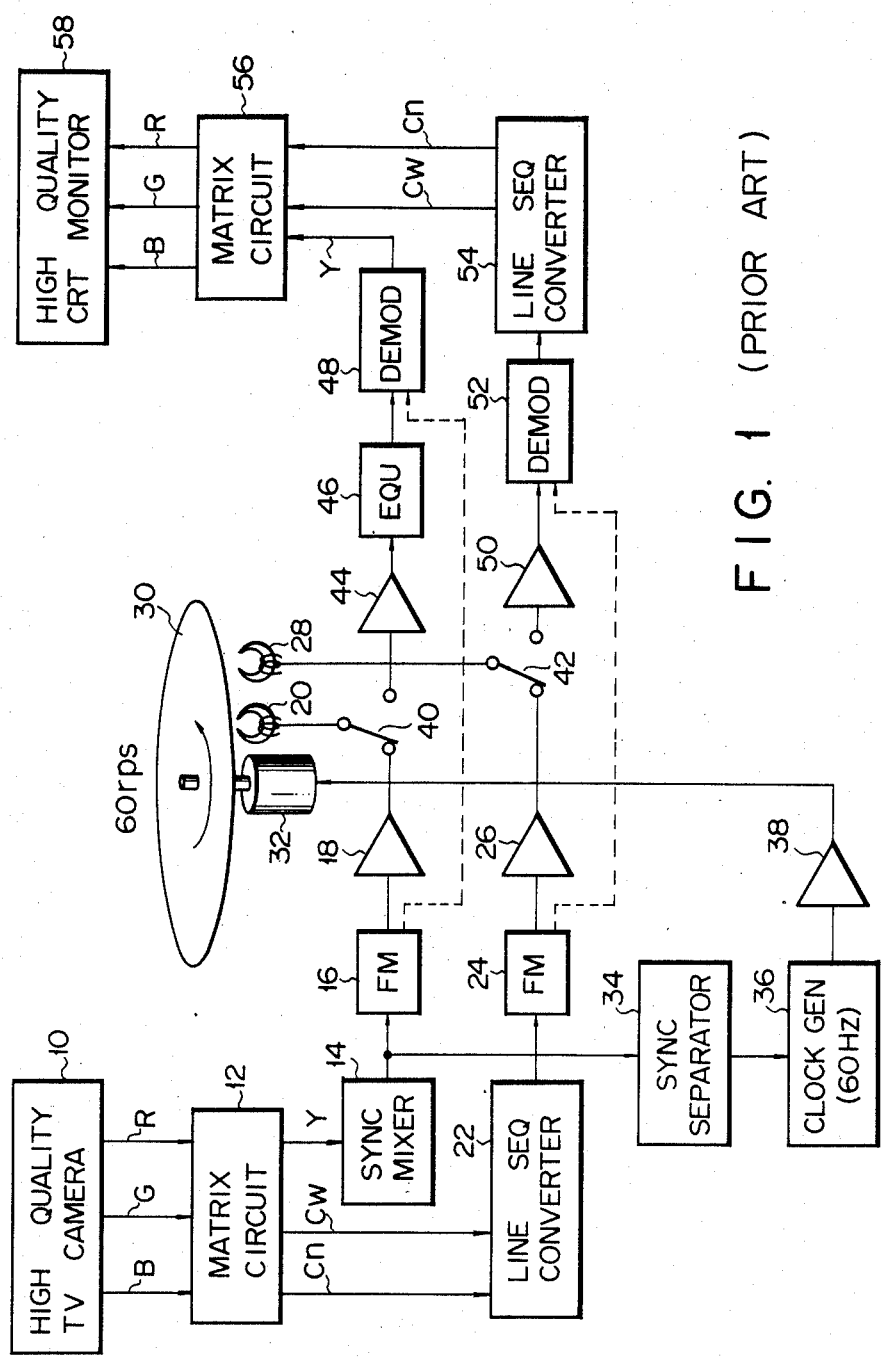
FIG. 1 is a block diagram of a conventional fixed-installation type high quality video signal recording/reproduction apparatus.
Figure 2:
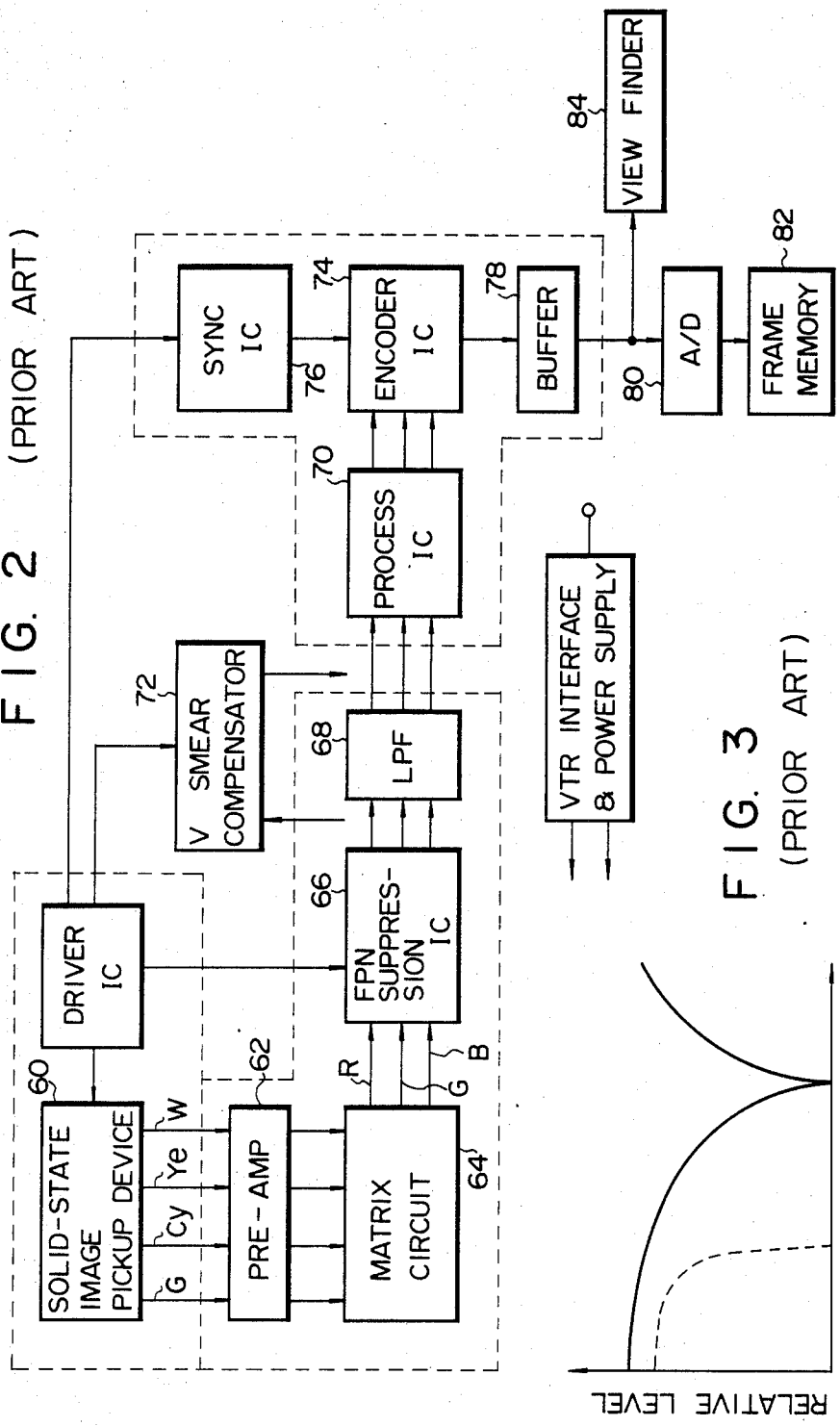
FIG. 2 is a block diagram of a conventional system for writing an NTSC video signal in a frame memory.
Figure 3:
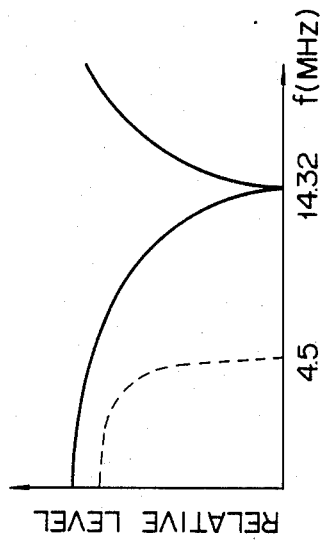
FIG. 3 is a graph for explaining frequency characteristics of the system of FIG. 2.
Figure 4:
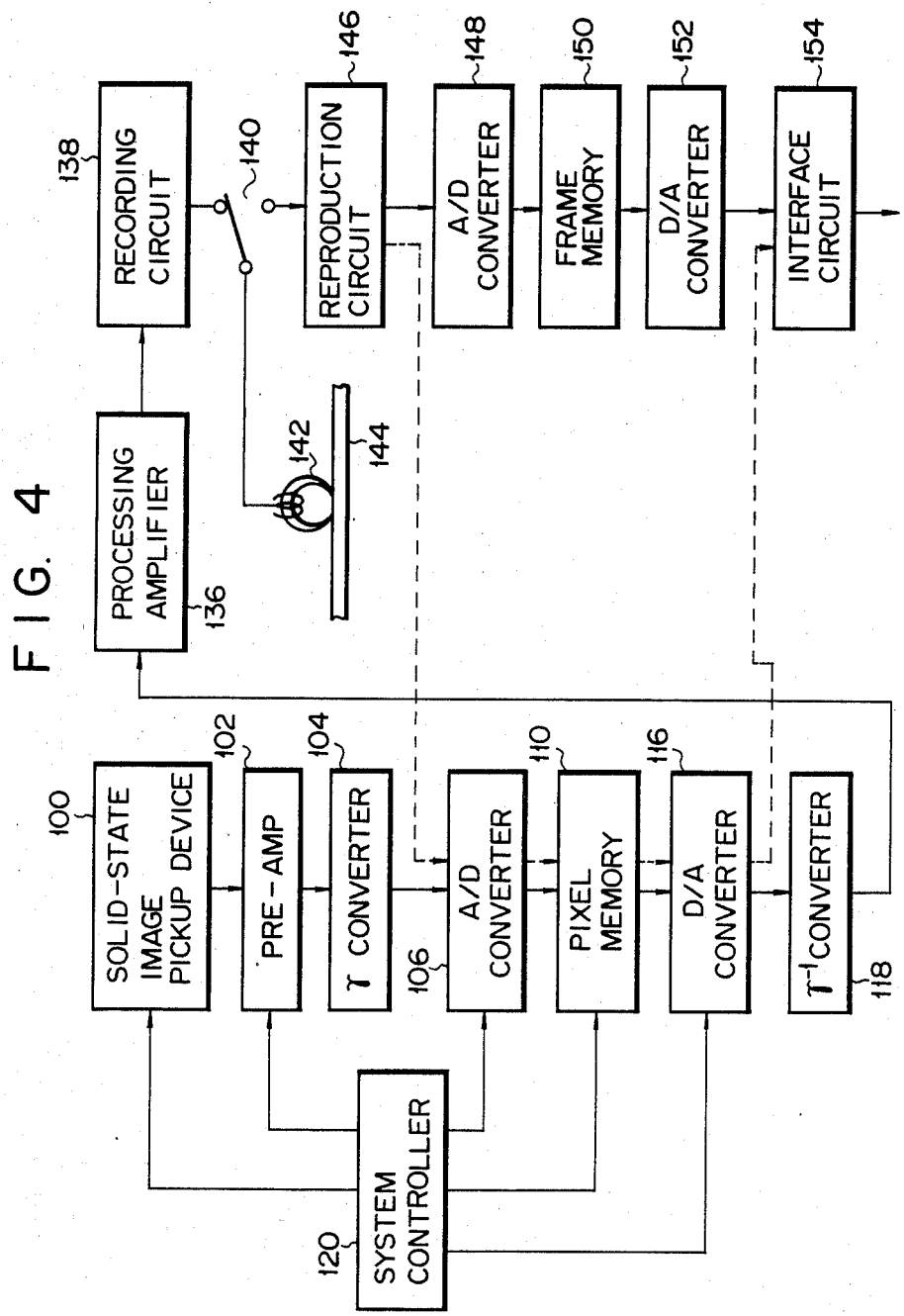
FIG. 4 is a block diagram of a video signal recording apparatus according to a first embodiment of the present invention.

FIG. 4 is a block diagram of a video signal recording apparatus according to a first embodiment of the present invention.

Figure 5:
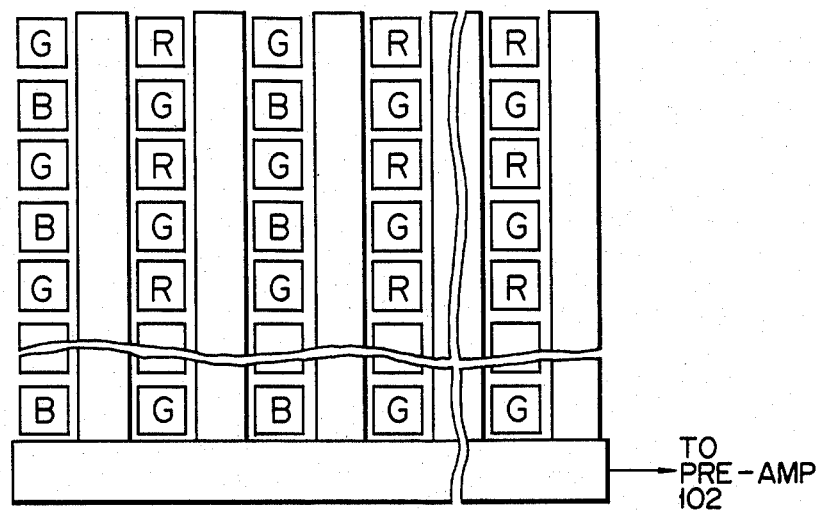
FIGS. 5, 6 and 7 show configurations of a solid-state image pickup device of the apparatus shown in FIG. 4.
Figure 6:
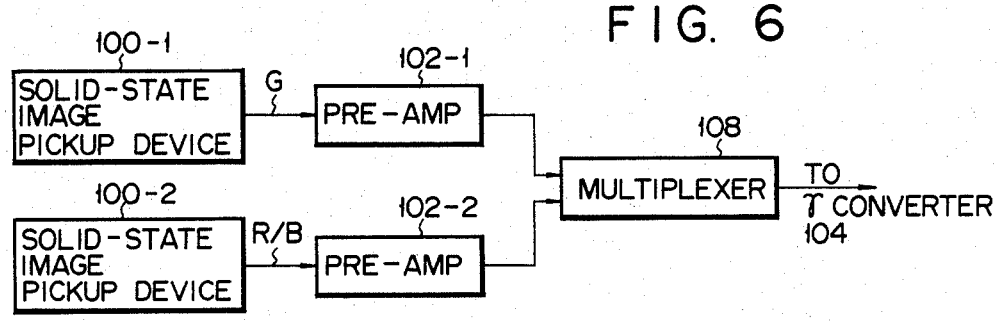
Figure 7:
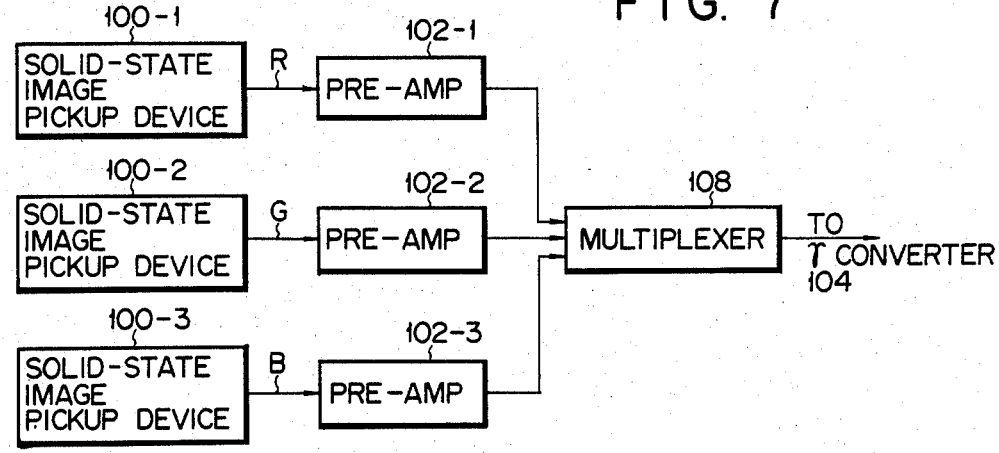

A solid-state image pickup device 100 comprises a plurality of elementary areas arranged in a matrix form. Each of the elementary areas produces an electrical signal responsive to the intensity of an incident light thereto for photoelectric conversion. The electrical signals are produced from the respective elementary areas and primarily read out from the solid-state image pickup device 100 in a discrete form. The discrete signals correspond to the respective pertinent areas of an image porjected on the solid-state image pickup device 100. For the sake of simplicity, these elementary areas will be called "pixels" hereinafter. Discrete pixel signals from a solid-state image pickup device 100 are amplified and sampled/held as a continuous signal by a pre-amplifier 102. The continuous signal is then supplied to an A/D converter 106 through a $\gamma$ converter 104. Any type of solid-state image pickup device having a plurality of pixels arranged in a matrix form can be used as the solid-state image pickup device 100. For example, the solid-state image pickup device 100 can comprise an X-Y address type device having photoelectric transducer elements and switching elements which are arranged in a matrix form, or a signal charge transfer type device having a CCD or BBD. When the solid-state image pickup device 100 is used for color image pickup, it can be constituted by a single-plate type interline CCD device having a filter of R, G and B patterns formed in a mosaic form, as shown in FIG. 5. A two-plate type device (FIG. 6) for G and R/B, or a three-plate type device (FIG. 7) for R, G and B can be also used. In the first embodiment, the R, G and B color component signals are serially read out as a single signal. If a pickup device having a plurality of plates is used, the color component signals are extracted as a single pixel signal through a multiplexer 108.

Figure 8:
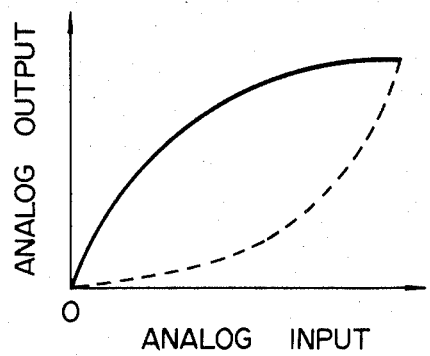
FIG. 8 is a graph showing the input/output characteristics of a $\gamma$ converter and a $\gamma^{-1}$ converter of the apparatus shown in FIG. 4.

When optical data is converted to an analog electric signal and then to a digital electric signal, an S/N ratio tends to be lowered at the low luminance. This is because, as one reason, the solid-state image pickup device has a low S/N ratio at the low luminance. Also, since the level of the analog signal is low at the low luminance, the number of bits assigned thereto is small, so that external noise and quantization noise are increased. In order to eliminate these drawbacks, the $\gamma$ characteristic of the pixel signal is changed by the $\gamma$ converter 104 in this embodiment before the pixel signal is A/D-converted. The input/output characteristics of the $\gamma$ converter 104 are shown by the solid curve in FIG. 8. The analog component at the low luminance side of the pixel signal is increased, so the S/N ratio at the low luminance is improved. Therefore, the pixel signal becomes nonlinear with respect to luminance. This $\gamma$ conversion need not be performed.

Figure 9:
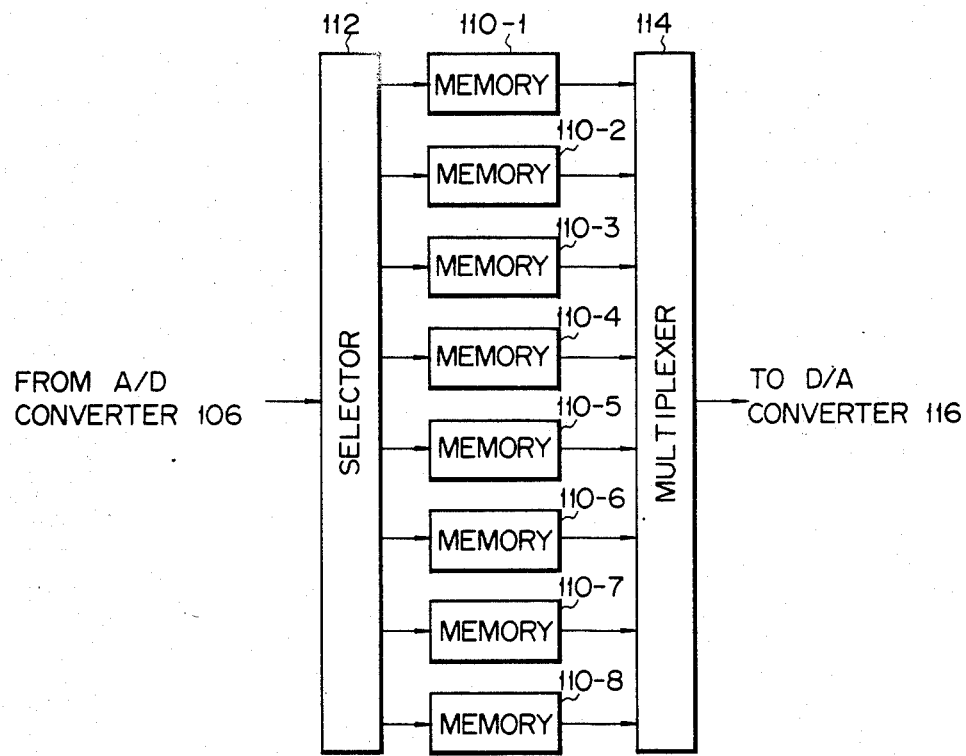
FIG. 9 is a block diagram of a pixel memory of the apparatus shown in FIG. 4.

An output from the $\gamma$ converter 104 is converted by the A/D converter 106 to an 8-bit (one-byte) digital signal. This digital signal is written in a pixel memory 110. The A/D converter 106 samples the pixel signals at the moment corresponding to the intermediate time point of the discrete pixel signals from the solid-state image pickup device 100 and converts the pixel signals respectively to digital signals. In this manner, the pixel signal from the solid-state image pickup device 100 is written in the pixel memory 110 in real time. The sampling frequency of the A/D converter 106 can be the same as that of the drive clock input to the solid-state image pickup device 100. For example, if the number of pixels of the solid-state image pickup device 100 is 1,000×1,000 and an image pickup operation is performed at 30 frames/second, the sampling frequency of the A/D converter 106 is set to be 30 MHz. Therefore, a portable video signal recording apparatus can be obtained in accordance with present semiconductor techniques. When the R, G and B component signals are parallel-read out and the individual color component signals are respectively stored in the pixel memory, the sampling frequency at the time of A/D conversion is reduced to one-third (i.e., 10 MHz) of the sampling frequency. Since each pixel requires one-byte of memory capacity, the pixel memory 110 has a capacity (byte) corresponding to the number of pixels of the solid-state image pickup device. In an image pickup device having 1,000×1,000 pixels, the pixel memory 110 has a capacity of 8 Mbits. As shown in FIG. 9, the pixel memory 110 comprises memories 110-1 to 110-8 which respectively correspond to bits of the 8-bit data, a selector 112 for classifying the serial output signal from the A/D converter 106 into bit signals, and a multiplexer 114 for multiplexing the output signals from the memories 110-1 to 110-8 into a single signal. Each of the memories 110-1 to 110-8 has a memory capacity of 1 Mbit. The memory 110-1 stores data of bit 0 ($2^0$), the memory 110-2 stores data of bit 1 ($2^1$), ..., and the memory 110-8 stores data of bit 7 ($2^7$). The memory 110-1 stores data of bit 0 among the pixel data in accordance with the pixel order. When a parallel output type A/D converter 106 is used, the selector 112 need not be used. A CCD analog shift register as a delaying means can be arranged in the post stage of the pre-amplifier 102 to lower the write rate with respect to the read rate of the pixel memory 110.

The discrete pixel signals from the solid-state image pickup device 100 are amplified and sample/held as a continuous signal by the pre-amplifier 102. The amplified signal is directly A/D-converted without performing video processing or filtering, and the A/D-converted signal is written in the pixel memory 110. As a result, the sampling frequency at the time of A/D conversion can be decreased, and the memory capacity can be decreased. For these reasons, a high quality video signal can be recorded in a portable apparatus.

The prescribed object of the present invention can be achieved by the above configuration. A plurality of pixel memories for a plurality of frames causes high production costs. In practice, the signal read out from the pixel memory 110 is rerecorded in a large-capacity memory. A magnetic tape, a magnetic disc, an opto-magnetic disc, a CMOS memory, a bubble memory, an EEPROM, an MNOS memory, etc. can be used as the large-capacity memory from the viewpoints of a ratio of volume to the number of bits, power consumption, operating speed, cost and so on. In this embodiment, a magnetic disc is used.

A solid large-capacity memory (e.g., bubble memory, CMOS memory, EEPROM) has high power consumption at a high speed. When such a solid large-capacity memory is used, the overall circuit arrangement, including peripheral circuits, results in high cost. On the other hand, an optical, magnetic or optomagnetic memory accompanying relative movement increases in size at a higher speed and has a low write efficiency.

A readout signal from the pixel memory 110 is reproduced as a pixel signal from the solid-state image pickup device 100 through a D/A converter 116 and a $\gamma^{-1}$ converter 118. The $\gamma^{-1}$ converter 118 performs an inverse conversion of the $\gamma$ converter 104. The input/output characteristics of the $\gamma^{-1}$ converter 118 are shown by the broken curve in FIG. 8. Difficulties are caused due to the fact that the $\gamma$ characteristic, i.e. optic input vs. current output characteristic, of the pickup device is arbitrarily set or changed. Therefore, an image of various graduation is picked up if the $\gamma$ converter 104 has a variable function for $\gamma$ characteristic. In this case, it is not necessary to provide the $\gamma^{-1}$ converter 118 since the $\gamma$ characteristic of the pickup device is not preserved. The readout rate of data from the pixel memory 110 and operating speed of the D/A converter 116 need only comply with the write rate of data in the large-capacity memory and need not be high speed. For this reason, when the read/write frequency of the large-capacity memory is low, the data can be read out from the pixel memory 110 at a rate lower than the write rate. In this manner, the frequency characteristics can be changed through the pixel memory, so that a high quality video signal having a high frequency band can be recorded on a recording medium having conventional low frequency characteristics.

Figure 10:
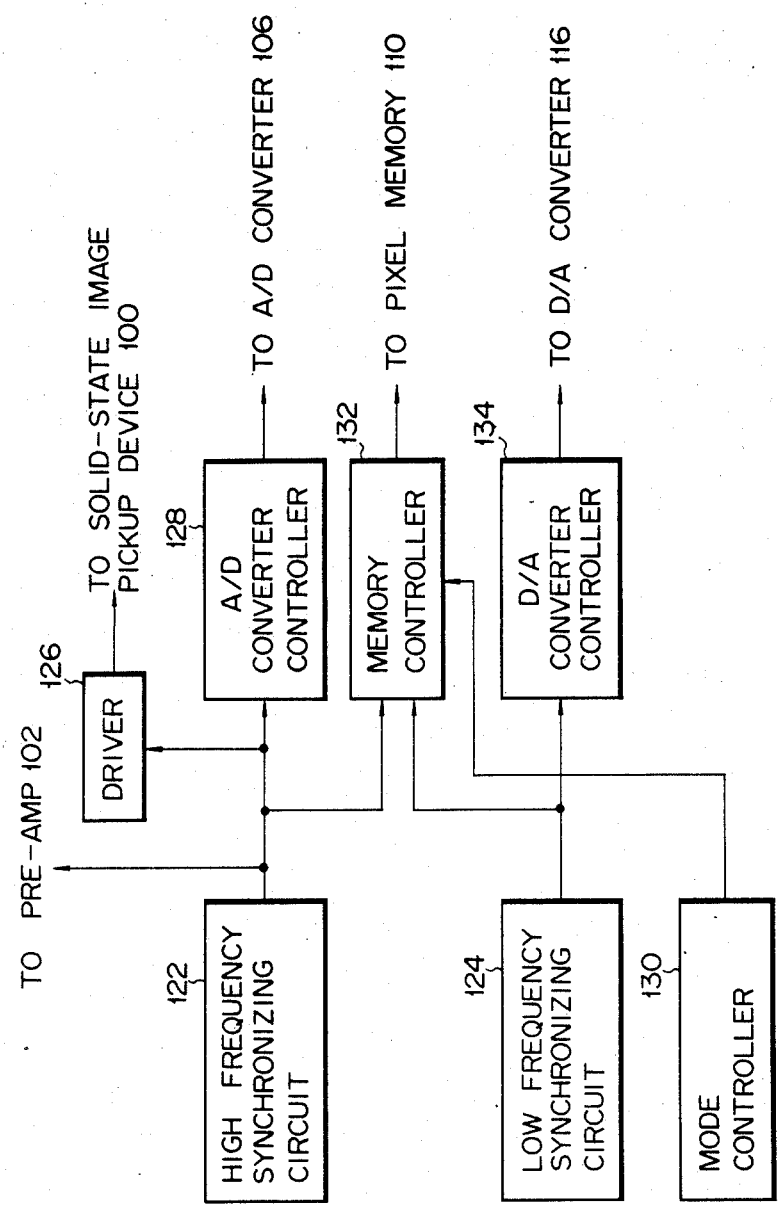
FIG. 10 is a block diagram of a system controller of the apparatus shown in FIG. 4.

The operating timings of the solid-state image pickup device 100, the pre-amplifier 102, the A/D converter 106, the pixel memory 110 and the D/A converter 116 can be controlled by a system controller 120. As shown in FIG. 10, the system controller 120 has a high frequency synchronizing circuit 122 for generating an operating timing reference up to the write operation of data in the pixel memory 110, and a low frequency synchronizing circuit 124 for generating an operating timing reference after the read out operation of data from the pixel memory 110. An output signal from the high frequency synchronizing circuit 122 is supplied as a clock signal to the solid-state image pickup device 100 through a driver 126, as a clock signal to the A/D converter 106 through an A/D converter controller 128 and as a clock signal to the pre-amplifier 102. The outputs from the high and low frequency synchronizing circuits 122 and 124 and an output from a mode controller 130 for determining the read/write mode of the pixel memory 110 are supplied to a memory controller 132. An output from the memory controller 132 is supplied as a clock signal to the pixel memory 110. In the memory write mode, the memory controller 132 supplies the output from the high frequency synchronizing circuit 122 to the pixel memory 110. In the memory read mode, the memory controller 132 supplies the output from the low frequency synchronizing circuit 124 to the pixel memory 110. The output from the low frequency synchronizing circuit 124 is also supplied as a clock signal to the D/A converter 116 through a D/A converter controller 134. The operating mode and operating clock frequency of the solid-state image pickup device 100 are first selected, and then the frequency of the high frequency synchronizing circuit 122 is determined. Therefore, although the operating mode of the image pickup device changes, the recording system can cover the operation up to the stage involving the pixel memory 110.

An output from the $\gamma^{-1}$ converter 118 is supplied to a processing amplifier 136 and is subjected to sync mixing, fixed pattern noise suppression, and vertical smear reduction. A composite video signal is thus supplied from the processing amplifier 136 to a recording circuit 138. The recording circuit 138 includes an FM modulator and a recording amplifier to FM-modulate and amplify the video signal. This signal is then supplied to a magnetic head 142 through a switch 140, and is recorded on a magnetic disc 144. The $\gamma$ characteristic of the solid-state image pickup device is generally equal to 1. However, the $\gamma$ characteristic of the solid-state image pickup device excluding the devices for measurement is often smaller than 1. In this case, the $\gamma^{-1}$ converter 118 can be omitted.

The above components are generally arranged in a single electronic camera housing, and a reproduction system is separately arranged. However, the reproduction system can be built into the camera housing. The reproduction system is constructed as follows. The reproduced video signal from the magnetic disc 144 is supplied to a reproduction circuit 146 through the switch 140. An output from the reproduction circuit 146 is supplied to an interface circuit 154 through an A/D converter 148, a frame memory 150 and a D/A converter 152. The data is stored in the frame memory 150 at a low rate and is read out therefrom at a high rate, in a manner opposite to the pixel memory 110. The frequency band of the video signal reproduced from the large-capacity memory 144 is increased to equal that of the image pickup device 100. Output from the interface circuit 154 is supplied to a CRT monitor, a printer etc., thereby reproducing a high quality still image.

According to the embodiment described above, the output video signals from the image pickup section 100 are first stored in the pixel memory 110 and then in the large-capacity memory 144, so that the frequencies of signals in the recording system can be decreased. As a result, the video signal in a high quality video system requiring a frequency band several times higher than that of the current NTSC system can be recorded by a conventional apparatus. This results in advantages in power consumption, quantization error and apparatus size. Furthermore, the pixel memory 110 of this embodiment has a capacity smaller than that of the conventional frame memory. The output signal from the solid-state image pickup device is given as an analog signal. However, digital data (position data) representing the array of pixels is obtained. Based upon the fact that the position data is given as digital data, the output pixel signal is directly written in the pixel memory, thereby decreasing the required capacity of the memory.

Figure 14:
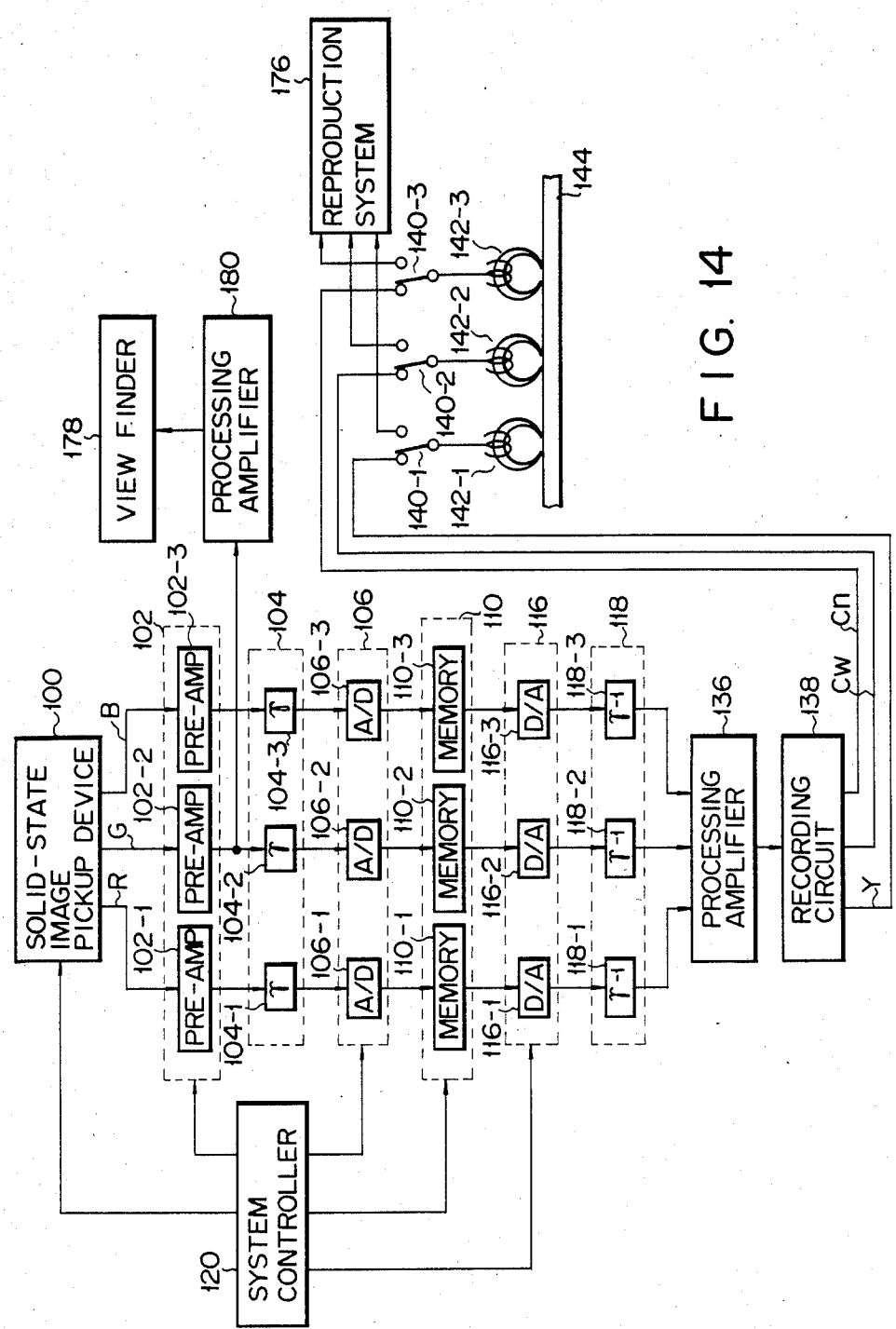
FIG. 14 is a block diagram of a video signal recording apparatus according to a third embodiment of the present invention.

In order to simply decrease the frequency characteristics, the read rate of data from the solid-state image pickup device can be decreased. However, this method is not preferred due to the following reasons. When read time is prolonged, a dark current in the device is increased to degrade the image quality. Also, a low read rate does not comply with the operating speeds of the external high quality CRT monitor and the electronic viewfinder, thus disabling image check. At the low read rate, the number of frames read out during one minute is small. The output signal from the solid-state image pickup device is supplied to the pre-amplifier to be amplified and sampled/held. The output signal from the pre-amplifier is supplied to an electronic view finder through a processing amplifier (FIG. 14). The pickup operator can select a framing, image quality and shutter timing with a monitor image on the view finder. If the frequency band of the high quality television system is high, only a G color component signal may be supplied to the view finder as a monochrome signal for simplicity. When the pickup device for an NTSC system is used, R, G and B color component signals are all supplied to the view finder as a monochrome signal. In this case, the monitor image has a high resolving power since the number of pixels is increased. Alternatively, in order to simply decrease the memory capacity, data compression of signal can theoretically be performed, but it cannot be performed here due to the following reason. Since the apparatus particularly records a still image, no correlation is available with the prior frame, so a frame correlation method cannot be used. Furthermore, since an arbitrary image is picked up, image quality is degraded by a line correlation method, and a large peripheral circuit must be used for signal compression.

The drawbacks of the recording system having the conventional frame memory will be described again. The number of memory bytes is increased to several times the number of pixels of the image pickup device. Even if the output signal from the image pickup device includes the position data of the pixel, this position data is not used in the frame memory, which stores coordinate-converted position data. As a result, unstable components such as jitter are increased. Furthermore, an additional circuit for image correction and video processing is required.

However, according to the first embodiment, the pixel memory is used for one form of data compression, so that data distribution in the frame memory can be eliminated. The first embodiment resembles image recording using a silver chloride film (i.e., chemical changes by light are treated at corresponding positions so as to fix position data, color data and intensity data).

Figure 11:
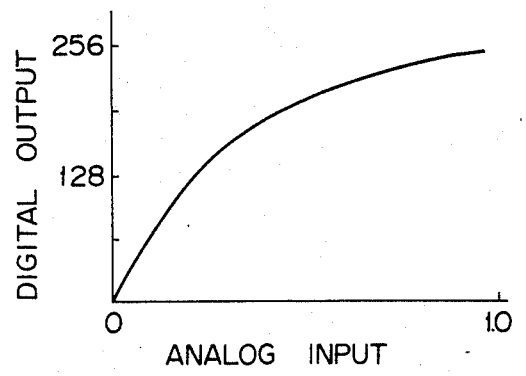
FIGS. 11 and 12 are graphs showing A/D and D/A converters having $\gamma$ and $\gamma^{-1}$ conversion functions, respectively, according to a modification of the apparatus shown in FIG. 4.
Figure 12:
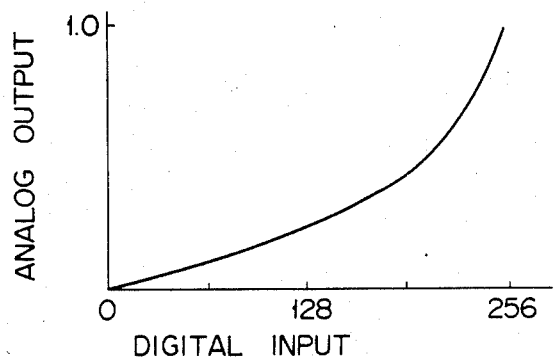

In the above description $\gamma$ conversion is performed in the analog region. However, the signal can be nonlinearly converted by the A/D and D/A converters 106 and 116 without arranging the γ and γ⁻¹ converters 104 and 118. The input/output characteristics of the A/D and D/A converters 106 and 116 are illustrated in FIGS. 11 and 12, respectively.

In this embodiment, when the frequency characteristics of external equipment such as the CRT monitor, the printer and so on do not greatly differ from those of the recording system, the output from the reproduction circuit 146 can be supplied to the interface circuit 154 through the A/D converter 106, the pixel memory 110 and the D/A converter 116, as indicated by the broken lines in FIG. 4. In this case, the A/D converter 148, the frame memory 150, and the D/A converter 152 can be omitted, but the memory capacity of the pixel memory 110 must be increased.

Figure 13:
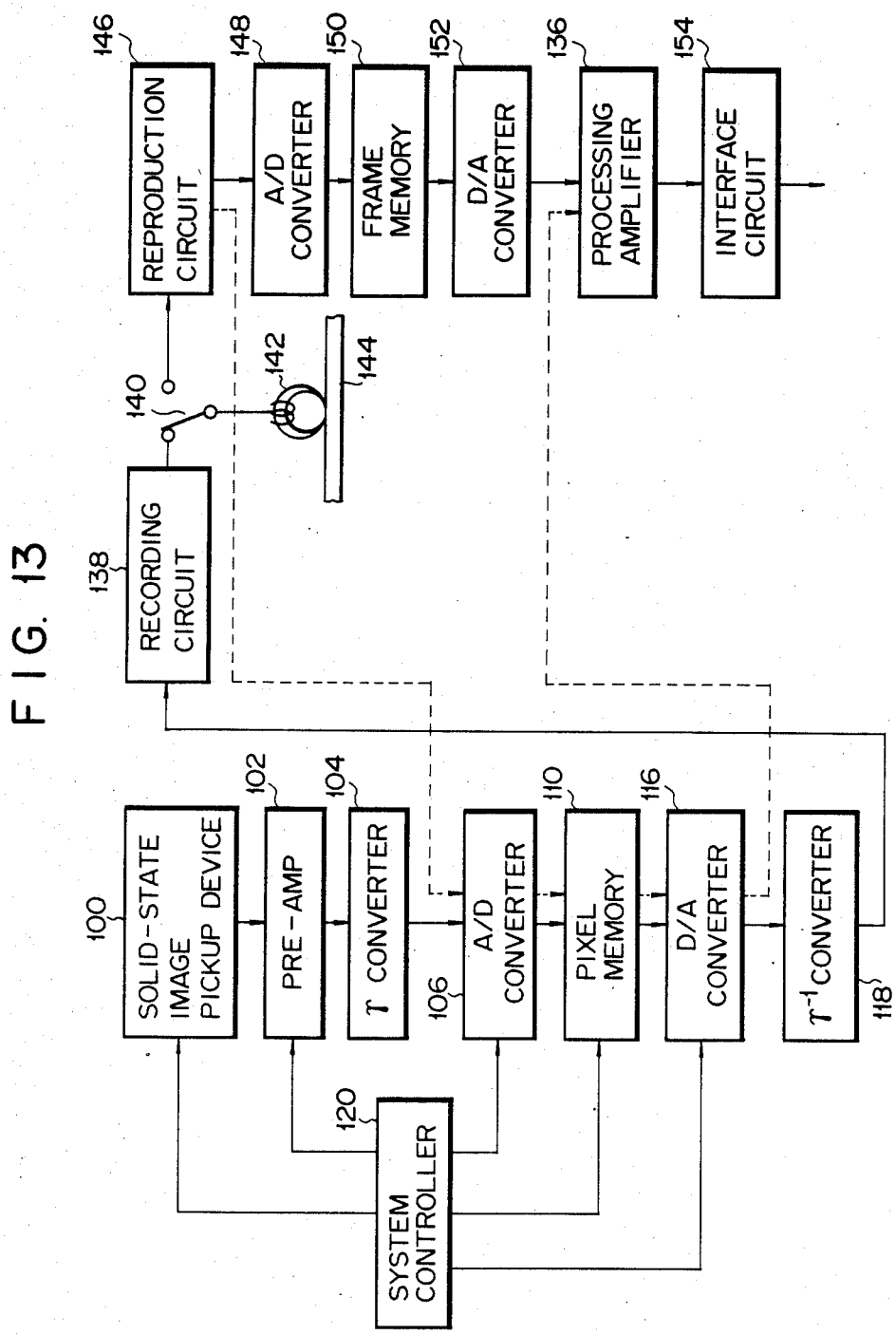
FIG. 13 is a block diagram of a video signal recording apparatus according to a second embodiment of the present invention.

A video signal recording apparatus according to other embodiments of the present invention will now be described. The same reference numerals used in the first embodiment denote the corresponding parts in the other embodiments. FIG. 13 is a block diagram of a video signal recording apparatus according to a second embodiment. The RGB serial read operation is performed in the second embodiment in the same manner as in the first embodiment. However, in the second embodiment, the pixel signal instead of a video signal is written in the large-capacity memory 144. A processing amplifier 136 is connected between a D/A converter 152 and an interface circuit 154 in the reproduction system for reproducing data from the large-capacity memory 144. According to the second embodiment, the frequency band of reproduction signal from the large-capacity memory 144 is changed by a frame memory 150 before the reproduction signal is converted by the processing amplifier 136 to a video signal. For this reason, it is possible for the capacity of the frame memory 150 and that of the pixel memory 110 to be equal. Therefore, even if the frame memory is used together with the pixel memory, the capacity of the pixel memory need not be increased.

Figure 15:
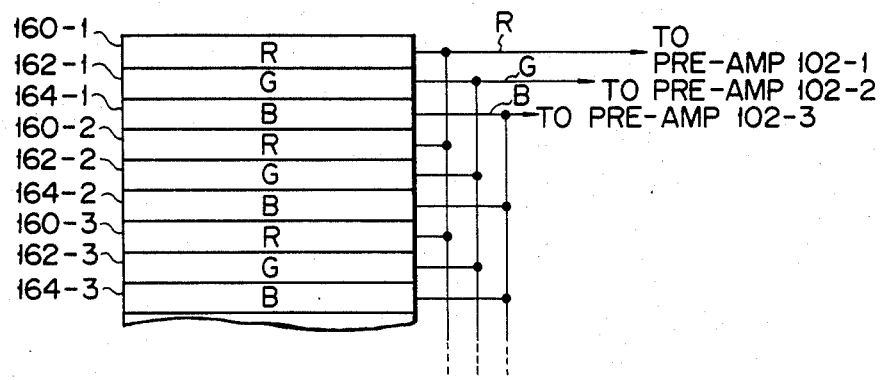
FIGS. 15, 16 and 17 show the configuration of a solid-state image pickup device of the third embodiment shown in FIG. 14.
Figure 17:
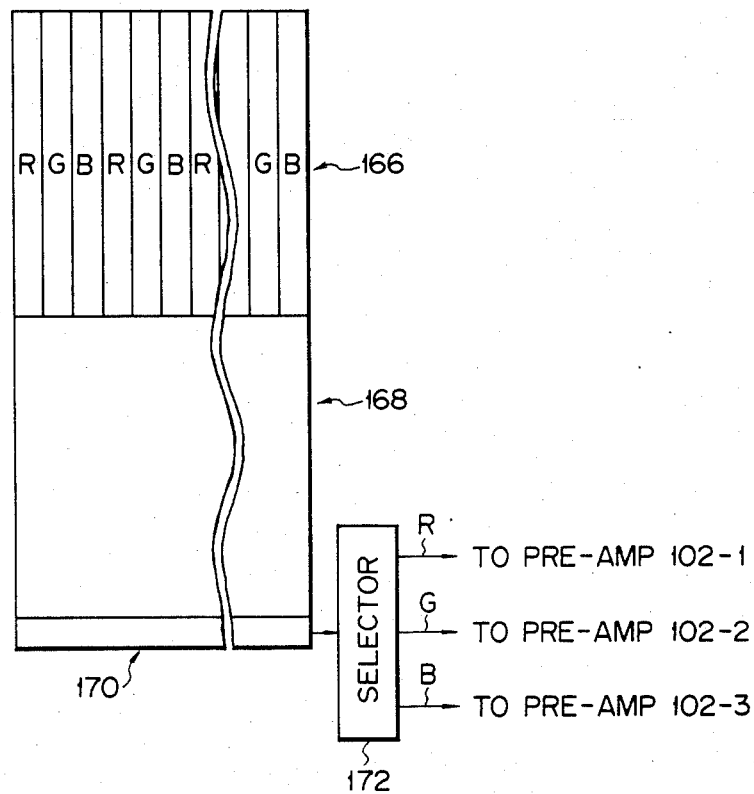
Figure 16:
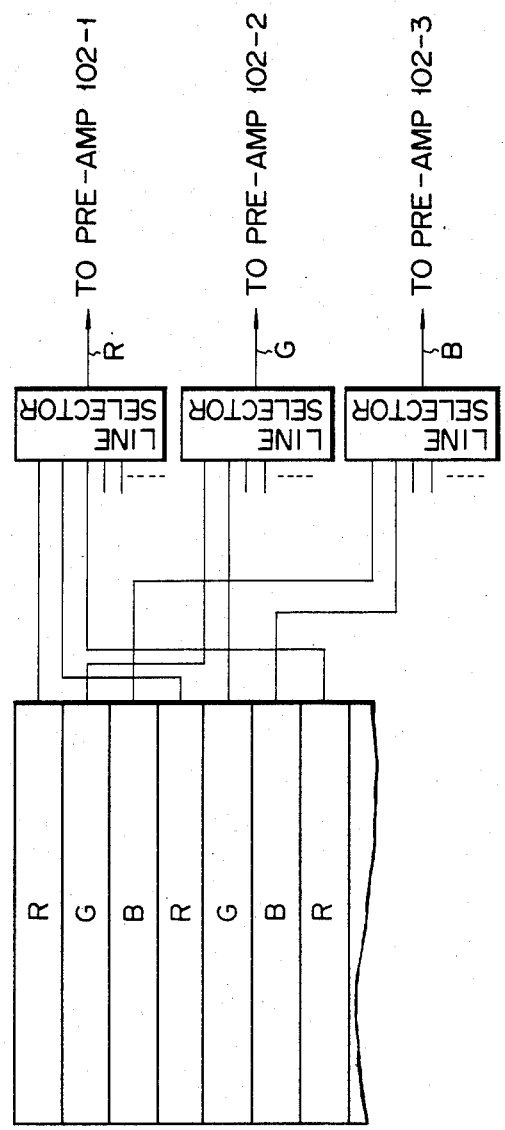

FIG. 14 shows a video signal recording apparatus according to a third embodiment of the present invention. According to this embodiment, the R, G and B color component signals are parallel-read out from a solid-state image pickup device 100 and are processed as parallel signals until they are supplied to a processing amplifier 136. The solid-state image pickup device 100 is not limited to a three-plate type but may be extended to a single-plate type. Single-plate type cameras are exemplified in FIGS. 15, 16 and 17, respectively. In the camera shown in FIG. 15, R, G and B color filters 160, 162 and 164 are arranged on a two-dimensional array of pixels in units of horizontal scanning sections, i.e., in units of color lines. When this camera is the X-Y addressing camera, the R color component signal is produced from the R filter 160-1, and then G and B color component signals are produced from the G and B filters 162-1 and 164-1, respectively. This readout operation is sequentially repeated, thereby sequentially reading out one-frame data in accordance with the given order of color lines. In the camera of FIG. 15, the R, G and B signals are not read out simultaneously. If three line selectors 165-1, 165-2, 165-3 for red, green and blue components are connected to the R, G and B color filters 160, 162 and 164, as shown in FIG. 16, the R, G and B signals are read out simultaneously. Therefore, in the camera of FIG. 16, the readout frequency of the camera is decreased to one-third of that of the camera shown in FIG. 15. FIG. 17 shows a single-plate type solid-state image pickup device using a frame transfer CCD. R, G and B color filters corresponding to vertical pixel arrays are arranged in a photoelectric transducer section 166. Charges of the pixels in the photoelectric transducing section 166 are simultaneously transferred to a charge storage section 168 and are read out from a horizontal shift register 170 in units of horizontal scanning lines. In the pixel signal for every horizontal scanning line, the R, G and B color components sequentially appear for every pixel. Therefore, the output from the shift register 170 is supplied to the selector 172 which classifies the output into R, G and B component signals for every pixel. The one-frame data corresponding to all the pixels are sequentially read out for every color point. The readout operation in units of pixels need not be performed by the frame transfer CCD. If a checkerboard color filter is used, a MOS device or an interline CCD can perform the above-mentioned readout operation.

The readout rate of the component signals from the solid-state image pickup device is one-third of the serial readout since RGB parallel-readout is performed. A memory 110 has three memories 110-1, 110-2 and 110-3 for the individual color components, as shown in FIG. 18. Each of the memories 110-1, 110-2 and 110-3 comprises eight memories 174-1 to 174-8 for storing corresponding bits of 8-bit signals obtained by A/D conversion. The outputs from an A/D converter 106 are parallel-produced in units of bits. The selector, shown in FIG. 9, need not be used in this case. Similarly, since parallel data is supplied to a D/A converter 116, the multiplexer shown in FIG. 9 need not be used. If an image pickup device has 1125 (V)×1398 (H) pixels and 8-bit data is assigned to each pixel, the memory capacity required for each color component signal is given as approximately 4 Mbits $(=2^{22} =4,194,000=1125\times1398\times8\times\frac{1}{3})$. The capacity of each of the memories 174-1 to 174-8 is approximately 524 kbits $(=524,287=2^{19})$.

The process amplifier 136 converts the input R, G and B signals into the luminance signal Y, and the wide and narrow band chrominance signals $C_W$ and $C_N$. After frequency modulation by the recording circuit 138 these component signals are recorded on a magnetic disc 144 through magnetic heads 142-1, 142-2 and 142-3, respectively. In the third embodiment of the present invention, the Y, $C_W$ and $C_N$ component signals are recorded, respectively. The reproduction component signals from the magnetic heads 142-1, 142-2 and 142-3 are supplied to a reproduction system 176 which includes the reproduction circuit 146, A/D converter 148, frame memory 150, D/A converter 152 and interface circuit 154. According to the third embodiment, there is further provided a monochrome electronic viewfinder 178 for checking the recorded image. After the G component signal from the solid-state image pickup element 100 is preamplified by a pre-amplifier 102-2, it is produced as a monochrome composite video signal by a processing amplifier 180. This monochrome composite video signal is supplied to the electronic viewfinder 178. Therefore, the recorded image can be displayed in real time. The electronic viewfinder 178 comprises a CRT, an LCD or an LED. It is generally very difficult to display a high quality image in real time due to performance, cost and apparatus size considerations. However, according to the technique described above, the current NTSC electronic viewfinder can be used for this purpose without modification.

The pixel signals need not read out in units of color components to decrease a read rate of data from the solid-state image pickup device 100 (i.e., decrease a sampling frequency of the A/D converter 106). Instead, the pixel region of the image pickup device may be divided into several small areas. Output signals from the small areas can be simultaneously parallel-processed.

Figure 19:
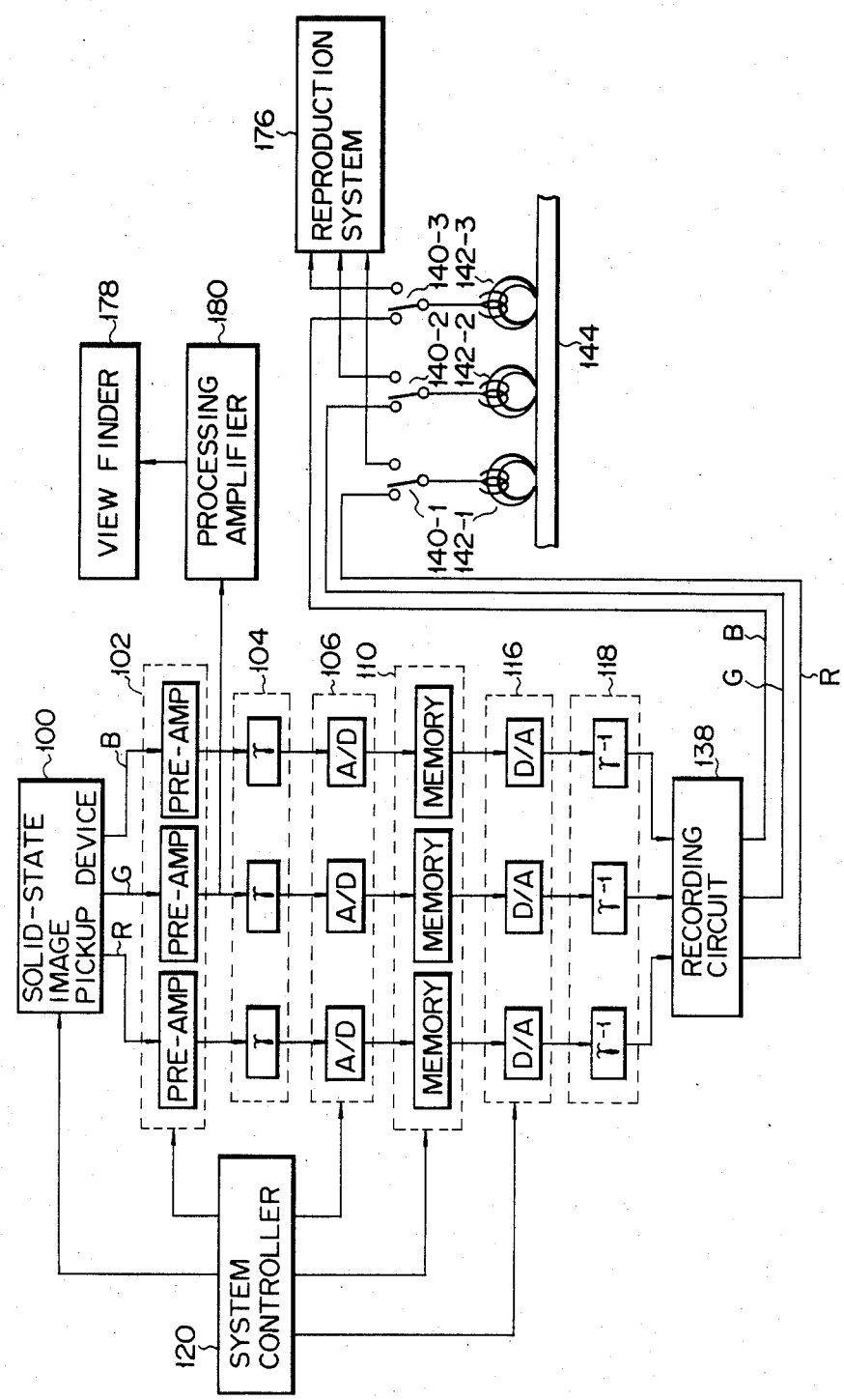
FIG. 19 is a block diagram of a video signal recording apparatus according to a fourth embodiment of the present invention.

FIG. 19 is a block diagram of a video signal recording apparatus according to a fourth embodiment of the present invention. This embodiment is implemented by modifying the recording system for recording a signal on the magnetic disc 144 of the third embodiment. An output from a $\gamma^{-1}$ converter 118 is not supplied to a processing amplifier 180 but to a recording circuit 138 so as to record the R, G and B color component signals. According to this technique, no luminance signal is prepared by the processing amplifier. In this case, even if the read rate of data from a pixel memory 110 is set to be equal to the write rate thereof, the frequency in the recording system will not be higher. As a result, this technique is also suitable for recording a high quality motion picture.

FIG. 20 shows a video signal recording apparatus according to a fifth embodiment of the present invention. In this embodiment, the R, G and B color component signals are parallel-processed up to the stage of the write operation with respect to a pixel memory 110. The readout signals R, G and B from the pixel memory 110 are composed by a multiplexer 182. The composite signal is supplied to a recording circuit 138 through a D/A converter 116, a $\gamma^{-1}$ converter 118 and a processing amplifier 136. The recording circuit 138 supplies a composite video signal to a single magnetic head 142, and it is then recorded on a magnetic disc 144.

According to the present invention as described above, a portable video signal recording apparatus is described wherein the image pickup section is disposed together with the recording section in the camera housing so as to suitably record a high quality video signal having a high frequency band.

The present invention is not limited to the particular embodiments described above. Various changes and modifications may be made within the spirit and scope of the present invention. This invention also applies to an NTSC, PAL or SECAM color television system as well as the high quality television system.

What is claimed is:

1. A video signal recording apparatus, comprising:
   image pickup means having a plurality of elementary areas for photoelectric conversion, for obtaining respective electrical signals in analog form, wherein each of the analog signals is identifiable with a different one of said elementary areas;
   analog-to-digital (A/D) converting means for converting said electrical analog signals into corresponding digital signals;
   memory means directly coupled to said A/D converting means for storing said digital signals in respective addresses corresponding to said elementary areas;
   control means coupled to said image pickup means and said A/D converting means for controlling their respective operations with a common clock signal at a certain frequency;
   a $\gamma$ converter coupled between said image pickup means and said A/D converting means for amplifying low level signal components more than relatively higher level signal components of said electrical analog signals obtained by said image pickup means, and for providing to said A/D converting means a corresponding output analog signal wherein the low level signal components are emphasized to obtain an improved signal-to-noise (S/N) ratio for said low level signal components prior to conversion of same by said A/D converting means;
   means coupled to said memory means for converting the digital signals stored in said memory means into video signals having a frame rate corresponding to the frequency of said clock signal; and
   means for storing said video signals on a recording medium to be reproduced for visual display.

2. An apparatus according to claim 1, wherein said image pickup means sequentially generates different color component signals in units of horizontal scanning lines.

3. An apparatus according to claim 1, wherein said image pickup means simultaneously produces a plurality of color component signals.

4. An apparatus according to claim 1, wherein said image pickup means has a matrix including 1125 vertical and 1365 horizontal elementary areas for photoconversion.

5. An apparatus according to claim 1, wherein said memory means has a capacity of $M \times N$ bits where M is the number of elementary areas for photoconversion of said image pickup means and N is the number of bits of said A/D converting means.

6. An apparatus according to claim 1, wherein said A/D converting means assigns more bits of a digital output to a low level component than to a high level component.

7. An apparatus according to claim 1, further comprising reproducing/recording means connected to said memory means so as to have a memory capacity larger than that of said memory means.

8. An apparatus according to claim 7, wherein said reproducing/recording means has a frequency band lower than that of said image pickup means, and the signal is read out from said memory means at a read rate lower than a write rate thereof.

9. An apparatus according to claim 8, wherein said reproducing/recording means comprises a solid-state memory, a magnetic memory, or optical memory which is operated at an NTSC TV frequency band.

10. A video signal recording apparatus according to claim 1, wherein said A/D converting means is arranged to issue digital signals each having a predetermined number of binary digits and said memory means includes a predetermined number of digital memories.

11. A video signal recording apparatus according to claim 1 or 10, wherein said image pickup means produces different color signals, and each of said color signals is supplied to the respective A/D converting means and memory means.

12. A video signal recording apparatus according to claim 1 or 10, wherein said image pickup means comprises a frame transfer charge coupled device (CCD) with a color mosaic filter for sequentially generating the different color signals, and a selector with a plurality of output terminals, the number of the output terminals being equal to the number of the different color signals for the purpose of respectively outputting the different color signals from said image pickup means.

13. A video signal recording apparatus according to claim 1 or 10 wherein said image pickup means comprises a plurality of CCDs, the number of the CCDs being equal to the number of the different color signals.

14. A video signal recording apparatus according to claim 1 or 10, wherein said image pickup means produces a linear image signal which linearly varies with respect to the light intensity, said image pickup means comprising means for emphasizing the signal component of said linear image signal corresponding to the low light intensity.

* * * * *